Patented Dec. 20, 1932

1,891,447

UNITED STATES PATENT OFFICE

WILLIAM L. RINTELMAN, OF MILWAUKEE, AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

PROCESS OF PREPARING DIARYL-1,2,5,6-ANTHRAQUINONE-DITHIAZOLE BODIES

No Drawing.  Application filed April 20, 1931.  Serial No. 531,634.

This invention relates to a process of preparing diaryl-1,2,5,6-anthraquinone-dithiazole bodies.

In the copending application of William L. Rintelman, filed of even date herewith, Serial No. 531,633, there is disclosed and claimed a novel sulfide derivative of 2,6-diamino-anthraquinone, which may be readily prepared by subjecting 1,5-dimercapto-2,6-diamino-anthraquinone or a salt thereof to the action of a mild oxidizing agent, such as a current of air.

We have now found that the said sulfide derivative is capable of being directly converted into dyestuffs of the diaryl-anthraquinone dithiazole type, by treatment with an aromatic aldehyde, in the same manner as when preparing said dithiazole dyestuffs from 1,5 - dimercapto - 2,6 - diamino-anthraquinone. This discovery is of great technical value, because the sulfide derivative can be isolated in dry form more economically than the corresponding dimercaptan, and lends itself to purification, for instance by recrystallization, much more readily than said dimercaptan.

The conversion into a dyestuff may be effected by reacting the novel sulfide derivative of 2,6-diamino-anthraquinone with an aryl-aldehyde in any suitable manner. For instance, the sulfide derivative may be dissolved in concentrated sulfuric acid and treated with benzaldehyde at but slightly elevated temperatures, or it may be suspended in water or any other inert liquid and heated with benzaldehyde to reflux temperatures, or it may be dissolved or suspended in dilute sulfuric acid, and heated to an intermediate temperature. In the two latter processes the product obtained is in the dihydro or leuco form, and it is therefore necessary to oxidize the reaction mass before isolation of the dyestuff. Other reactive aryl-methane derivatives may be used instead of benzaldehyde, such as, for example, benzal-chloride or benzo-trichloride.

Without limiting our invention to any particular procedure, the following examples in which parts by weight are given, will serve to illustrate our method in its preferred form.

*Example 1.*—10 parts of the 1,5-sulfide derivative of 2,6-diamino-anthraquinone, obtainable for instance by passing a stream of air through an aqueous, slightly alkaline solution of the disodium salt of 1,5-dimercapto-2,6-diamino-anthraquinone as described more fully in the copending application, Serial No. 531,633, are dissolved in 200 parts of sulfuric acid monohydrate. 7.5 parts of benzaldehyde are added at about 35 to 45° C., and the reaction mass is stirred at this temperature for a period of about 20 hours. If desired, the temperature may be raised to about 70° C. at which temperature the reaction proceeds much faster. When the reaction is substantially complete, the mass is diluted with water to a sulfuric acid concentration of about 85%, and the greenish yellow crystals which separate are filtered off, and washed first with 85% sulfuric acid and then with water. Optionally, the entire mass may be drowned in 2000 parts of water, filtered and washed.

The dyestuff thus obtained constitutes a 1,2,5,6 - anthraquinone - diphenyl dithiazole body in a state of high purity. Its dyeings upon cotton from a vat, produced in the ordinary manner, exhibit great brilliance and purity of shade.

*Example 2.*—The procedure is the same as in Example 1, except that sulfuric acid of about 75 to 78% is used, and the temperature is allowed to reach about 100 to 150° C. When the reaction is complete, the mass is poured into water, aerated and filtered.

*Example 3.*—10 parts of the sulfide derivative described in Example 1 are suspended in 200 parts of water; 7.5 parts of benzaldehyde are added, and the mixture is refluxed at about 100° C. for about 18 to 36 hours. The mixture is now rendered alkaline with caustic soda, and the leuco body therein contained is oxidized in a known manner, such as, for instance, by blowing a stream of air through it or by adding a suitable oxidizing agent such as sodium hypochlorite or sodium perborate. The precipitated dyestuff is then filtered and washed in the usual manner.

*Example 4.*—10 parts of the 1,5-sulfide derivative of 2,6-diamino-anthraquinone, obtainable as in Example 1, are dissolved in 200 parts of 7% oleum at room temperature. 8 parts of benzaldehyde are then added, and the mass is stirred for 1 hour at about 25–30° C., then gradually heated during a period of about 1 hour to 70° C. and maintained at this temperature for about 2 hours. The mass is now cooled to about 25–35° C. and 37 parts of water are gradually dropped in over a period of 5 hours. The mass is then stirred at about 25 to 30° C. for about 6 hours, and the resulting greenish-yellow crystals are filtered off and washed with 100 parts of 83% sulfuric acid. The filter cake is now sludged up with 800 parts of cold water, filtered, and washed with cold water until free of acid. Upon drying and grinding the dyestuff (a 1,2,5,6 - anthraquinone - diphenyl-dithiazole body) is obtained in a state of high purity. Optionally, the condensation mass may be drowned in 2000 parts of water, filtered and washed.

*Example 5.*—10 parts of the 1,5-sulfide derivative of 2,6-diamino-anthraquinone as described in Example 1 are dissolved in 200 parts of sulfuric acid monohydrate. 10 parts of orthochloro-benzaldehyde are added, the mixture is heated to about 70° C. and held at this temperature until the reaction is completed (about 2 hours). The mixture is now cooled, poured into water, filtered and washed acid free. It is then stirred for several hours with 20 parts of a hot 10% solution of sodium hypochlorite to oxidize the impurities, and finally filtered again with water until free of hypochlorite. The dyestuff is obtained in the form of a yellow paste which forms a reddish violet vat and dyes cotton greenish yellow shades. Its composition most probably corresponds to 1,2,5,6-anthraquinone - di(ortho-chloro-phenyl) - dithiazole or the corresponding dithiazoline or a mixture of the two.

*Example 6.*—10 parts of the sulfide derivative described in Example 1 are dissolved in 200 parts of sulfuric acid monohydrate which is then diluted with 50 parts of water. The mixture is heated to about 100° C., 10 parts of anisic aldehyde (para) are added and the mixture heated further to about 150° C. During this procedure the reaction mass changes color from yellow to red and increases in viscosity. Upon continued heating for about 20 minutes it again changes color to a brown, and becomes considerably thinner in consistency. The reaction mass is now drowned in water, filtered, and the filter cake washed until acid free. The paste thus obtained is of an orange color, and dyes cotton from a reddish violet vat in red to yellow shades. It most probably constitutes 1,2,5,6-anthraquinone di-(methoxy-phenyl)-dithiazole or the corresponding dithiazoline or a mixture of the two.

In the claims below it should be understood that, by the expressions "dyestuff of the diaryl-1,2,5,6-anthraquinone-dithiazole series", and "a diphenyl-1,2,5,6-anthraquinone-dithiazole body" we mean to cover and include both the thiazole form of said dyestuffs, the thiazoline or dihydro-thiazole form, as well as mixtures of the thiazole and the thiazoline bodies, since it is not conclusive which of the two forms correctly describes the product of reactions of this general type. Our experience leads us to believe that the designation of these compounds as "thiazoles" in the art may be erroneous, and that what is truly formed in reactions of this type are mixtures of thiazoles with the corresponding thiazolines.

By the term "mild oxidation" we mean to include oxidation of the 1,5-dimercapto-2,6-diamino-anthraquinone with mild oxidizing agents such as, for example, a current of air, sodium perborate and the like as is more fully described in the copending application of William L. Rintelman, Serial No. 531,633, filed of even date herewith.

We are aware that numerous details of the process may be varied through a wide range without departing from the principles of this invention, and we, therefore, do not purpose limiting the patent granted hereon otherwise than necessitated by the prior art.

We claim as our invention:

1. In the process of preparing a dyestuff of the diphenyl-1,2,5,6-anthraquinone-dithiazole series, the step which comprises condensing with benzaldehyde a sulfide derivative of 2,6-diamino-anthraquinone obtainable by mild oxidation of 1,5-dimercapto-2,6-diamino-anthraquinone.

2. In the process of preparing a dyestuff of the diphenyl-1,2,5,6-anthraquinone-dithiazole series, the step which comprises condensing with anisic aldehyde a sulfide derivative of 2,6-diamino-anthraquinone obtainable by mild oxidation of 1,5-dimercapto-2,6-diamino-anthraquinone.

3. In the process of preparing a diphenyl-1,2,5,6-anthraquinone-dithiazole body, the steps which comprise dissolving in concentrated sulfuric acid a sulfide derivative of 2,6-diamino-anthraquinone obtainable by mild oxidation of 1,5-dimercapto-2,6-diamino-anthraquinone, adding benzaldehyde to the mixture, heating to about 35 to 70° C., diluting the reaction mass to a sulfuric acid concentration of about 85% and isolating the precipitated dyestuff.

4. In the process of preparing a diphenyl-1,2,5,6-anthraquinone-dithiazole body, the steps which comprise dissolving in weak oleum a sulfide derivative of 2,6-diamino-anthraquinone obtainable by mild oxidation of 1,5 - dimercapto - 2,6-diamino-anthraquinone, adding benzaldehyde to the mixture, heating to about 35 to 70° C., drowning the reaction mass in water, and isolating the precipitated dyestuff.

5. In the process of preparing a dyestuff of the diaryl-1,2,5,6-anthraquinone-dithiazole series, the step which comprises condensing a sulfide derivative of 2,6-diamino-anthraquinone obtainable by mild oxidation of 1,5-dimercapto-2,6-diamino-anthraquinone with a body having the following formula:

wherein R stands for an aromatic carbocyclic ring, X stands for a hydrogen or halogen atom and Y stands for oxygen or two halogen atoms.

6. In the process of preparing a dyestuff of the diaryl-1,2,5,6-anthraquinone-dithiazole series, the step which comprises condensing a sulfide derivative of 2,6-diamino-anthraquinone obtainable by mild oxidation of 1,5-dimercapto-2,6-diamino-anthraquinone with a body having the following formula:

wherein R stands for an aromatic carbocyclic ring.

In testimony whereof, we have hereunto subscribed our names at Carrollville, Milwaukee County, Wisconsin.

WILLIAM L. RINTELMAN.
ROBERT J. GOODRICH.